US008787361B2

(12) United States Patent
Menon et al.

(10) Patent No.: US 8,787,361 B2
(45) Date of Patent: *Jul. 22, 2014

(54) SYSTEM AND METHOD FOR CALL ROUTING AND PAGING ACROSS DIFFERENT TYPES OF NETWORKS

(71) Applicant: Intel Corporation, Santa Clara, CA (US)

(72) Inventors: Narayan Parappil Menon, Syosset, NY (US); Alan Gerald Carlton, Mineola, NY (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/755,690

(22) Filed: Jan. 31, 2013

(65) Prior Publication Data

US 2013/0143607 A1 Jun. 6, 2013

Related U.S. Application Data

(63) Continuation of application No. 12/839,506, filed on Jul. 20, 2010, now Pat. No. 8,385,330, which is a continuation of application No. 10/931,117, filed on Aug. 31, 2004, now Pat. No. 7,760,704.

(60) Provisional application No. 60/583,708, filed on Jun. 29, 2004.

(51) Int. Cl.
*H04W 40/00* (2009.01)
*H04M 3/42* (2006.01)

(52) U.S. Cl.
USPC .............. 370/352; 340/7.28; 340/286.07; 370/260; 370/314; 370/328; 370/335; 370/349; 379/112.06; 379/211.02; 455/2.01; 455/401; 455/436; 455/463; 455/552.1; 709/205

(58) Field of Classification Search
CPC ...... H04W 12/06; H04W 88/06; H04W 80/04; H04W 36/18
USPC ........... 340/7.26, 7.28, 286.07; 370/314, 328, 370/335, 338, 352, 260, 349; 455/426.1, 455/445, 458, 503, 2.01, 401, 404.1, 435.1, 455/436, 456.1, 463, 552.1; 709/205; 379/112.06, 211.02
See application file for complete search history.

(56) References Cited

U.S. PATENT DOCUMENTS 5,526,400 A * 6/1996 Nguyen ................. 455/432.2
5,561,701 A 10/1996 Ichikawa
(Continued)

FOREIGN PATENT DOCUMENTS

EP 1 069 796 1/2001
EP 1 193 989 3/2002
(Continued)

OTHER PUBLICATIONS

Office Action from Chinese Application No. 200580019713.1 issued Nov. 8, 2011, 9 pages.
(Continued)

*Primary Examiner* — Gerald Gauthier
(74) *Attorney, Agent, or Firm* — Blakely, Sokoloff, Taylor & Zafman LLP

(57) ABSTRACT

A network architecture uses an Application Server Autonomous Access (ASAA) server which allows paging and call routing across different types of wireless and wireline access networks. The ASAA server provides connectivity between an external voice or data network and a wireless transmit/receive unit (WTRU). The external voice or data network may be a public switched telephone network (PSTN) or a public data network (PDN), so that the connectivity between the external network and the WTRU is provided through the access networks using data from the ASAA server.

19 Claims, 4 Drawing Sheets

(56) References Cited

U.S. PATENT DOCUMENTS

| | | | |
|---|---|---|---|
| 5,734,985 A * | 3/1998 | Ito et al. | 455/503 |
| 5,802,453 A * | 9/1998 | Kuroki et al. | 340/7.26 |
| 5,828,949 A * | 10/1998 | Silver et al. | 455/433 |
| 5,901,360 A * | 5/1999 | Kim | 340/7.26 |
| 5,905,959 A * | 5/1999 | Foladare et al. | 455/445 |
| 5,940,385 A * | 8/1999 | Mita et al. | 370/349 |
| 5,970,387 A | 10/1999 | Yuan | |
| 6,064,886 A | 5/2000 | Perez et al. | |
| 6,192,250 B1 * | 2/2001 | Buskens et al. | 455/463 |
| 6,480,720 B1 | 11/2002 | Coan et al. | |
| 6,490,451 B1 | 12/2002 | Denman et al. | |
| 6,496,693 B1 * | 12/2002 | Tran | 455/426.1 |
| 6,512,748 B1 * | 1/2003 | Mizuki et al. | 370/314 |
| 6,683,871 B1 | 1/2004 | Lee et al. | |
| 6,847,825 B1 | 1/2005 | Duvall et al. | |
| 6,978,382 B1 | 12/2005 | Bender et al. | |
| 6,998,959 B2 * | 2/2006 | Lund | 340/7.28 |
| 7,010,300 B1 | 3/2006 | Jones et al. | |
| 7,039,030 B2 * | 5/2006 | Terry | 370/335 |
| 7,042,337 B2 * | 5/2006 | Borders et al. | 340/286.07 |
| 7,107,055 B2 | 9/2006 | Gallagher et al. | |
| 7,181,530 B1 | 2/2007 | Halasz et al. | |
| 7,379,705 B1 * | 5/2008 | Rados et al. | 455/2.01 |
| 7,394,795 B2 | 7/2008 | Chitrapu et al. | |
| 7,406,314 B2 * | 7/2008 | Sharma | 455/445 |
| 7,603,126 B2 | 10/2009 | Rosen et al. | |
| 7,760,704 B2 * | 7/2010 | Menon et al. | 370/352 |
| 7,899,172 B2 * | 3/2011 | Poustchi et al. | 379/211.02 |
| 8,014,367 B2 * | 9/2011 | Carlton et al. | 370/338 |
| 8,018,877 B2 * | 9/2011 | Lin | 370/260 |
| 8,130,924 B2 * | 3/2012 | Rossi et al. | 379/112.06 |
| 8,385,330 B2 * | 2/2013 | Menon et al. | 370/352 |
| 2002/0077826 A1 | 6/2002 | Hinde et al. | |
| 2003/0039242 A1 | 2/2003 | Moore, Jr. | |
| 2003/0050051 A1 | 3/2003 | Vilander | |
| 2003/0133425 A1 | 7/2003 | Radhakrishnan et al. | |
| 2003/0134638 A1 | 7/2003 | Sundar et al. | |
| 2004/0087307 A1 | 5/2004 | Ibe et al. | |
| 2004/0102199 A1 | 5/2004 | Haumont | |
| 2004/0148352 A1 * | 7/2004 | Menon et al. | 709/205 |
| 2004/0259569 A1 * | 12/2004 | Eason et al. | 455/456.1 |
| 2005/0009527 A1 * | 1/2005 | Sharma | 455/445 |
| 2005/0054348 A1 | 3/2005 | Turina et al. | |
| 2005/0141447 A1 * | 6/2005 | Carlton et al. | 370/328 |
| 2005/0221793 A1 * | 10/2005 | Chin et al. | 455/401 |
| 2005/0286495 A1 * | 12/2005 | Menon et al. | 370/352 |
| 2005/0287979 A1 * | 12/2005 | Rollender | 455/404.1 |
| 2008/0032713 A1 | 2/2008 | Yang | |
| 2011/0064024 A1 * | 3/2011 | Menon et al. | 370/328 |
| 2013/0143607 A1 * | 6/2013 | Menon et al. | 455/458 |

FOREIGN PATENT DOCUMENTS

| | | |
|---|---|---|
| JP | 2001-257737 | 9/2001 |
| JP | 2004-080691 | 3/2004 |
| KR | 2003-0017559 | 3/2003 |
| TW | 453079 | 9/2001 |
| TW | 560211 | 11/2003 |
| TW | 224707 | 6/2004 |
| WO | 00/41416 | 7/2000 |
| WO | 03/041441 | 5/2003 |
| WO | WO-03/041441 | 5/2003 |
| WO | WO-2006012191 | 2/2006 |

OTHER PUBLICATIONS

Office Action from Chinese Application No. 200580019713.1 issued Nov. 5, 2012, 7 pages.

Notice of Allowance from U.S. Appl. No. 12/839,506 mailed Oct. 3, 2012, 8 pages.

Akyildiz, et al., "A Dynamic Location Management Scheme for Next-Generation Multitier PCS Systems," IEEE Transactions on Wireless Communications, vol. 1, No. 1, pp. 178-189 (Jan. 2002).

Wang, et al., "Integrated Mobile IP and SIP Approach for Advanced Location Management," International Conference on 3G Mobile Communications Technologies, Vole 494, pp. 205-209 (Jun. 25, 2003).

Office Action from Taiwan Application No. 095100387 mailed Apr. 21, 2013, 5 pages.

Office Action from Chinese Application No. 200580019713.1 issued Jun. 3, 2012, 8 pages.

Office Action from Chinese Application No. 200580019713.1 issued Dec. 2, 2013, 6 pages.

* cited by examiner ic # SYSTEM AND METHOD FOR CALL ROUTING AND PAGING ACROSS DIFFERENT TYPES OF NETWORKS

CROSS REFERENCE TO RELATED APPLICATION(S)

This application is a continuation of, claims priority to, and incorporates by reference in its entirety for all purposes, the U.S. patent application Ser. No. 12/839,506, filed Jul. 20, 2010, which is a continuation of U.S. patent application Ser. No. 10/931,117, filed Aug. 31, 2004, which issued as U.S. Pat. No. 7,760,704 on Jul. 20, 2010, which claims the benefit of U.S. Provisional Application No. 60/583,708 filed on Jun. 29, 2004.

FIELD OF INVENTION

The present invention relates to networking architecture and wireless networking architecture. In particular the invention relates to the use of multiple network systems for communication services.

BACKGROUND

Current wireless technology allows a user to be paged for an incoming call, and for the call to be routed to the user's wireless transmit/receive unit (WTRU), within the domain of a single wireless access network. However, support of paging and call routing between different access technologies (e.g., 2G/3G wireless networks, CDMA 2000 networks, WLAN/Bluetooth networks) is not provided for with current mechanisms. A mechanism is desired whereby "application level" paging and call routing is possible across heterogeneous access networks, allowing a WTRU to roam between these networks and seamlessly receive calls via the currently connected access network.

SUMMARY

According to the present invention, an architecture for providing network services includes an Application Server Autonomous Access (ASAA) server which connects to a WTRU through at least a subset of the plurality of external voice and/or data communication networks. The ASAA server is responsive to received messages from the plurality of networks, such that a response to a paging request from a particular WTRU and received from one of the networks provides an indication of connectivity of the WTRU through said one of the networks. A communication is established between the network and the WTRU through network routing which includes said one of the networks in response to the received response to the paging request.

According to a further aspect of the present invention, wireless telecommunication services are provided to at least one WTRU by identifying at least a plurality of wireless access networks capable of providing wireless links to the WTRU. A server is capable of communicating with a plurality of the wireless access networks and determines a status of the WTRU in the sense of an ability to establish a radio link with one or more of the wireless access networks. The server establishes a server communication link a wireless access networks with which the WTRU has an ability to establish a radio link and uses the communication link to establish communication between the WTRU. The server communication link is then used to establish communication between the WTRU and a further destination through one of the access networks.

DETAILED DESCRIPTION OF THE PREFERRED EMBODIMENTS

Figure 1:
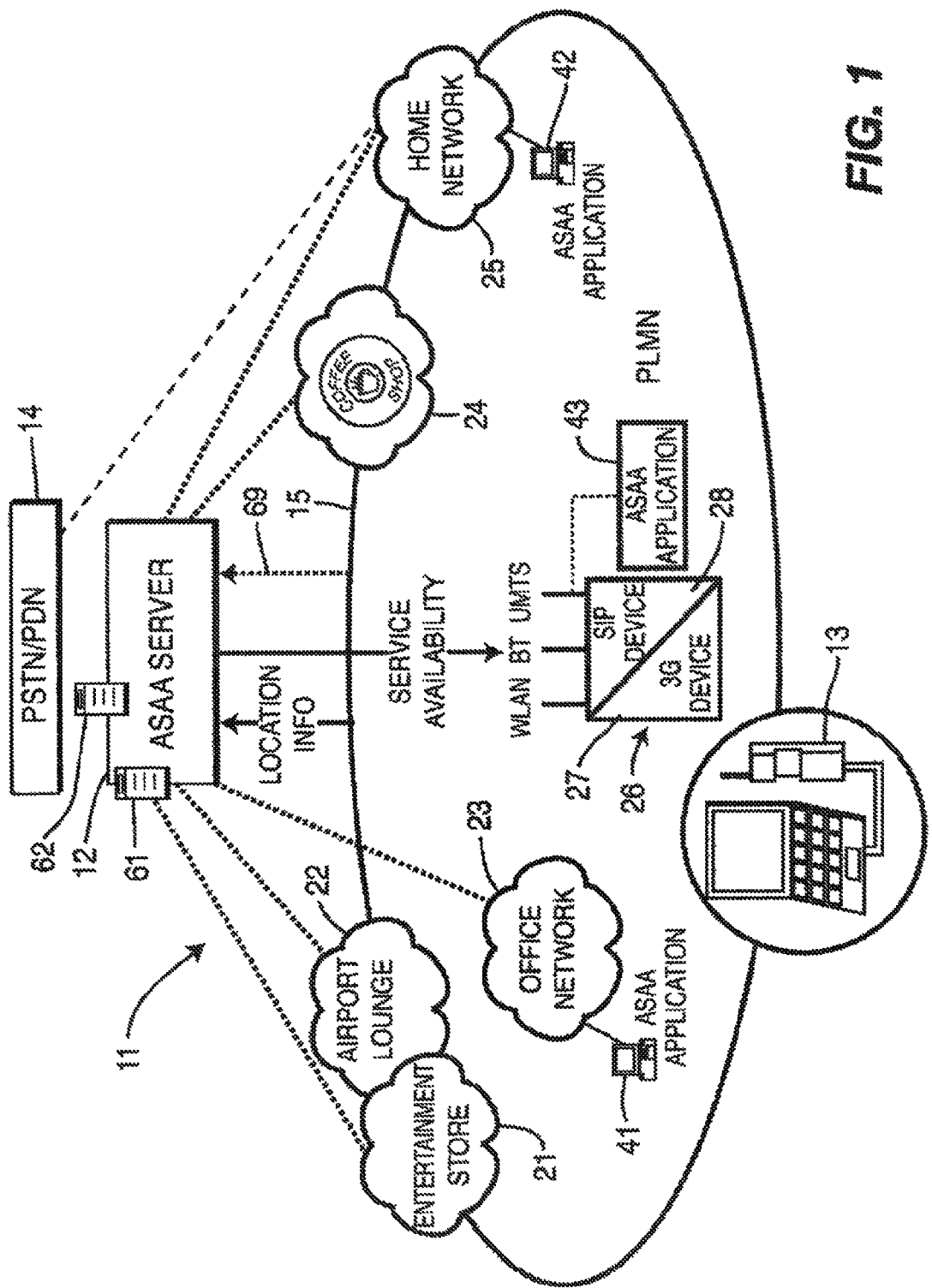
FIG. 1 is a schematic diagram showing an exemplary relationship between an ASAA server, network services and a WTRU according to the present invention.

As used herein, the terminology "wireless transmit/receive unit" (WTRU) includes but is not limited to a user equipment, mobile station, fixed or mobile subscriber unit, pager, or any other type of device capable of operating in a wireless environment. The terminology "base station" includes but is not limited to a Node B, site controller, access point or any other type of interfacing device in a wireless environment. An "access point" (AP) is a station or device which provides a wireless access for devices to establish a wireless connection with a LAN, and establishes a part of a wireless LAN (WLAN). If the AP is a fixed device on a WLAN, the AP is a station which transmits and receives data. The AP permits connection of a WTRU to a network, provided that the WLAN itself has a connection to the network.

According to the present invention, command, execution and user interface and paging and call routing is possible across heterogeneous access networks, allowing a user's wireless transmit/receive unit (WTRU) to roam between these networks and seamlessly receive calls via the currently connected access network. These services are deemed to be "application level" functions in that they are not dependent on a particular air interface. A system architecture allows paging and call routing across different types of wireless and wireline access networks. The system architecture is defined as adaptable to an Application Server Autonomous Access (ASAA) protocol and the protocol allows the paging and call routing across the different types of networks. According to the present invention, the services would come from the server, called an "ASAA Server". The individual networks would provide the wireless access in different domains, e.g. residence, enterprise, hotspot, and similar domains. The user may be subscribed to the different wireless access networks for access services, but also subscribe to consolidated services provisioning by the "ASAA operator". Alternately, it is possible that the subscriber has one subscription with the ASAA operator, who pays access fees to the access operators. The handling within the access networks is achieved in the manner by which the various networks currently handle access.

ASAA provides a services framework for providing consistent, seamless services to the user, as the user roams between different access networks. The architecture allows the user to be reachable on incoming calls as the user roams between these different networks. It also allows the user to receive a consistent set of services as he/she roams between the access networks. The ASAA Server provides this service consolidation.

As the WTRU roams between these networks, the WTRU can seamlessly receive calls via the currently connected access network. In the architecture and system concept, a server provides a fixed point of interconnection to the external voice/data network as the WTRU moves between different access networks. Examples of an external voice/data network are a public switched telephone network (PSTN) and a public data network (PDN). The ASAA architecture permits communication services at an application level to be provided a server independently of wireless connection services, and across different connection networks, and further permits transfer of application services between different connection networks. The ASAA architecture further permits services to be provided in a continuous manner with different WTRUs in the same communication session.

The ASAA architecture provides integration of network architecture such that different technology networks are interoperable with a wireless transmit/receive unit (WTRU). Examples of diverse networks include:
  third generation partnership program (3GPP) wideband code division multiple access (W-CDMA) communication system, which is an implementation of Universal Mobile Telecommunications System (UMTS);
  other wide-area public land mobile network (PLMN) systems;
  private networks, such as those implemented through WLAN systems, IEEE "802" systems and Bluetooth systems;
  private small office/home office (SOHO) networks, also implemented through WLAN systems, IEEE "802" systems and Bluetooth systems; and
  landline telephone network based systems.

In accordance with the present invention, the ASAA server consolidates location, service and routing information for subscribed users. The ASAA server routes calls and push services to the user's appropriate serving network, based on policy profiles. Policy profiles include location, technology network capabilities, behavioural factors, tariff criteria, and other criteria relevant to routing calls. The ASAA server permits use of Internet protocol (IP) based technologies, such as session initiation protocol (SIP), which supports technology convergence. The use of these standard protocols provide an ability for implementing ASAA architecture and services based on standard protocols such as IP and TCP/IP.

A WTRU configured in accordance with the present invention, with an ASAA application, will attempt to access the ASAA application server. This results in a registration action. Regular transmission of location information between the WTRU and the ASAA server provides the ASAA server with connection data. The ASAA protocol provides a consolidation of location, service and routing information for ASAA users across multiple technology networks. This allows seamless mobility between different technology networks, using a common IP-based scheme.

An ASAA server provides identification of network services available to the WTRU. When a call to the WTRU comes into the ASAA server, the ASAA server issues pages to the WTRU, via all the possible underlying access networks configured for the WTRU. The paging mechanism is IP-based, and functions at the application layer. The WTRU receives the paging request via the WTRU's current connected access network, and issues a paging response via the connected access network back to the ASAA server. The paging response informs the ASAA server of the identity of the WTRU's current connected access network. The ASAA server then routes the queued incoming call via that access network. This allows the user to be provided with a continuous service experience, as the WTRU moves between access networks. The ASAA server can provide a uniform set of supplementary services to the WTRU, regardless of which access network the WTRU is connected. The paging mechanism is at an end-to-end application level, preferably IP-based.

This allows seamless mobility, a seamless transfer function, and the ability to provide services which are transferable to different networks, providing that the particular network can support at least the communication of the service. This allows the user's profile to be applied across multiple networks, and allows the user to select services according to a single profile. Thus, if a particular service is free or offered at a flat rate, the user can predetermine to only accept the service according to the stated terms. Similarly, the use of the ASAA server permits the consolidation of services, such as billing.

FIG. 1 is a schematic diagram of a network environment 11, showing an exemplary relationship between an ASAA server 12, network service entities and a WTRU 13 according to the present invention. Depicted in the figure, in addition to the network environment 11 and the ASAA server 12, is a public switched telephone network or public data network (PSTN/PDN) 14 and a public land mobile network (PLMN) 15.

The PLMN 15 includes a plurality of LANs 21-25, depicted as an entertainment store 21 at an airport location, an airport lounge 22, an office network 23, a coffee shop 24 offering WLAN services, and a home network 25. The PLMN 15 also includes large area mobile services 26, which in the example includes a 3G device 27 and a SIP device 28. The large area mobile services 26 provide communication via WLAN, BT and UMTS. The LANs 21-25 and large area mobile services 26 form access networks. Typical communications through the LANs 21-25 are according to the IP protocol, SIP protocol or other packet-switched protocols. Typically, such communications use a common channel and are assigned bandwidth according to demand.

A plurality of ASAA application servers 41-43 are provided at various locations including at WLAN 23, home network 25 and the large area mobile services 26. These provide application services through their respective access networks 23, 25 and 26, but are also accessible through other access networks.

The WTRU 13 is depicted and is able to communicate with various ones of the access networks 21-26. The ASAA server 12 is able to establish a communication link with the WTRU 13 by connecting directly or indirectly to individual ones of the networks 21-28 to which the WTRU 13 has established a communication link. The services come from the ASAA server in this architecture. The access networks provide access to the user and hence, calls and other interactions between the user and the ASAA server are routed through the access network to which the user is connected. This enables the ASAA server 12 to function as a service platform in order to deliver services to the user through the various ones of the access networks 21-26.

The WTRU 13 is able to communicate through various services as provided via the WLAN 23, hut once connected, the ASAA server 12 can provide administrative functions to either provide services directly through the ASAA server 12, or request that services be routed between the various access networks 21-26 to an access network connected to the WTRU 13. The services are provided by the ASAA server 12 in this architecture. The access networks provide access to the WTRU 13, and hence calls and other interactions between the WTRU 13 and the ASAA server 12 are routed through the access network 21-26 to which the WTRU 13 is connected.

The ASAA server 12 also includes server function modules 61, 62. The server function modules 61, 62 provide administrative functions for operating the ASAA server 12, and maintaining a database of locations of the WTRU 13 and availability of connections to the access networks 21-26. The server function modules 61, 62 also provide application functions which can be executed by the WTRU through connections to the access networks 21-26.

The ASAA server 12 provides an anchored interface to the PSTN/PDN 14 for receipt/transmission of call attempts, and routes incoming calls to the WTRU's serving access network based on the WTRU's location. In routing incoming calls, the ASAA server 12 pages all underlying possible serving access networks configured for the WTRU 13. The WTRU 13 responds with a paging response, routed through currently connected serving network. The ASAA server 12 then delivers incoming calls, via a serving access network to which the WTRU 13 is currently connected.

The WTRU 13 can also "force-route" incoming call through a specified serving access network by configuring the ASAA server 12 appropriately, with the identity of serving access network to route the call through to its destination. By specifying the access network, the WTRU 13 can control which services are used.

This architecture broadens the traditional cellular paging and call routing mechanisms to work across a range of access networks. In one embodiment, an IP based application-level paging mechanism, which operates across a variety of access networks to help locate the WTRU 13 issued.

One embodiment includes a provision of a consolidated interface, via the ASAA server 12, to allow PSTN/PDN 14 receipt of calls. The ASAA server 12 allows PSTN/PDN 14 receipt of calls to be effected through a single anchor point. The effect is that, from the user's standpoint, radio link services are provided by the particular radio links, which are the individual ones of the access networks 21-26. The service management, which is the user's interface, can be either one of the local network 21-26 or the ASAA sever 12. Thus as indicated by dashed line 69, the system shifts the network administration for the user's services and the service management for the user "upward" from the individual access network 21-26 to the ASAA server 12. The ASAA server 12 then becomes a virtual server from the user's perspective. Network services are provided by the individual access networks 21-26 for the radio link, and by the ASAA server 12 for services provided to the user other than the radio link. If the operator of the ASAA server 12 is able to obtain wireless services as provided by the individual access networks 21-26, then the user is able to make service subscription arrangements with the operator of the ASAA server 12.

This architecture supports mobility of the WTRU 13 across multiple access networks, and helps locate the WTRU 13 seamlessly. The use of the ASAA server 12 allows for user-configured routing of calls through a given access network. This also provides a uniform set of supplementary services and features across multiple access networks, resulting in a continuity of user's experience despite network changes. The architecture also may provide a configuration for a uniform mechanism for provision of push services to the WTRU 13 across multiple underlying access networks.

The role of the ASAA server 12 providing an administrative function concerning routing of services to various access networks 12-26 makes the ASAA server 12 able to maintain a common location for user profiles. The user can determine what services to use, and under which physical circumstances. Examples of parameters include call handling, selection of services by type, selection of services by cost and cost structure, selection of services by network ownership, notification of availability of connections to services, user determined minimum quality of service (QOS), required bandwidth of services for a particular function. Call handling profile selection functions can include voicemail, selective admission of calls and "challenge" responses. In a similar manner, the ASAA server 12 can also provide the voicemail and other data management services.

Figure 2:
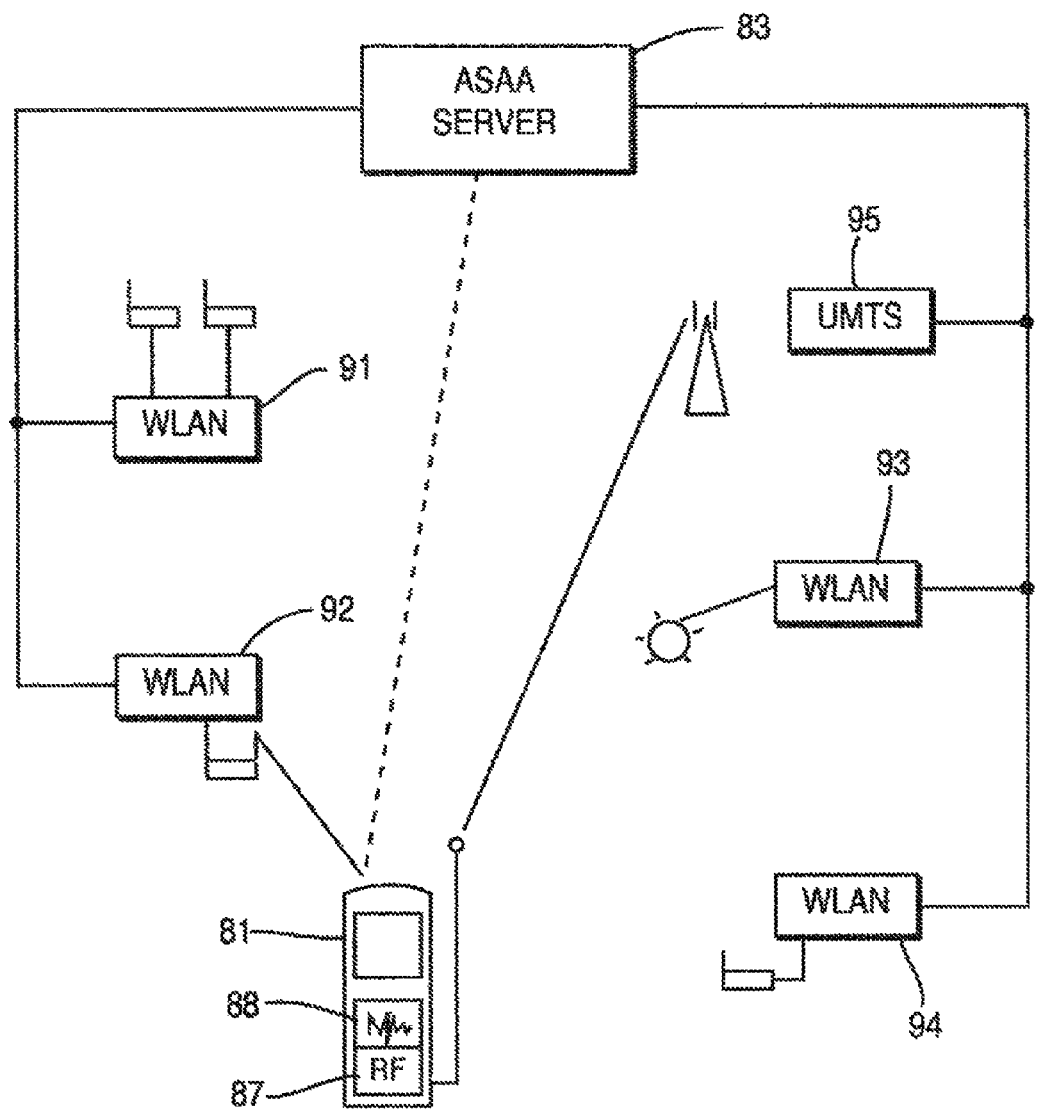
FIG. 2 is a diagram showing the relationship between a WTRU, an ASAA server and access networks.

FIG. 2 is a diagram showing the relationship between a WTRU 81, an ASAA server 83 and access networks 91-95. The WTRU includes circuitry for establishing an RF link 87 and circuitry for processing data 88, although some of these functions are integrated circuit functions. The WTRU 81 establishes a communications link with the ASAA server 83, but in general the service connection is between the WTRU 81 and one of the service networks 91-95. Services may be communicated either through the ASAA server 83 through the service network in radio communication with the WTRU 81. Alternatively, services may be communicated from one service network to a service network which establishes a radio link with the WTRU 81 without passing through the ASAA server 83. In the case of ASAA server supervised communications, communications which do not pass through the ASAA server 83 or originate with the ASAA server 83 may still be supervised by the ASAA server 83. Since the processing circuitry 88 handles the data regardless of its source, the actual connection to a particular service network 91-95 can be transparent to the user.

Figure 3:
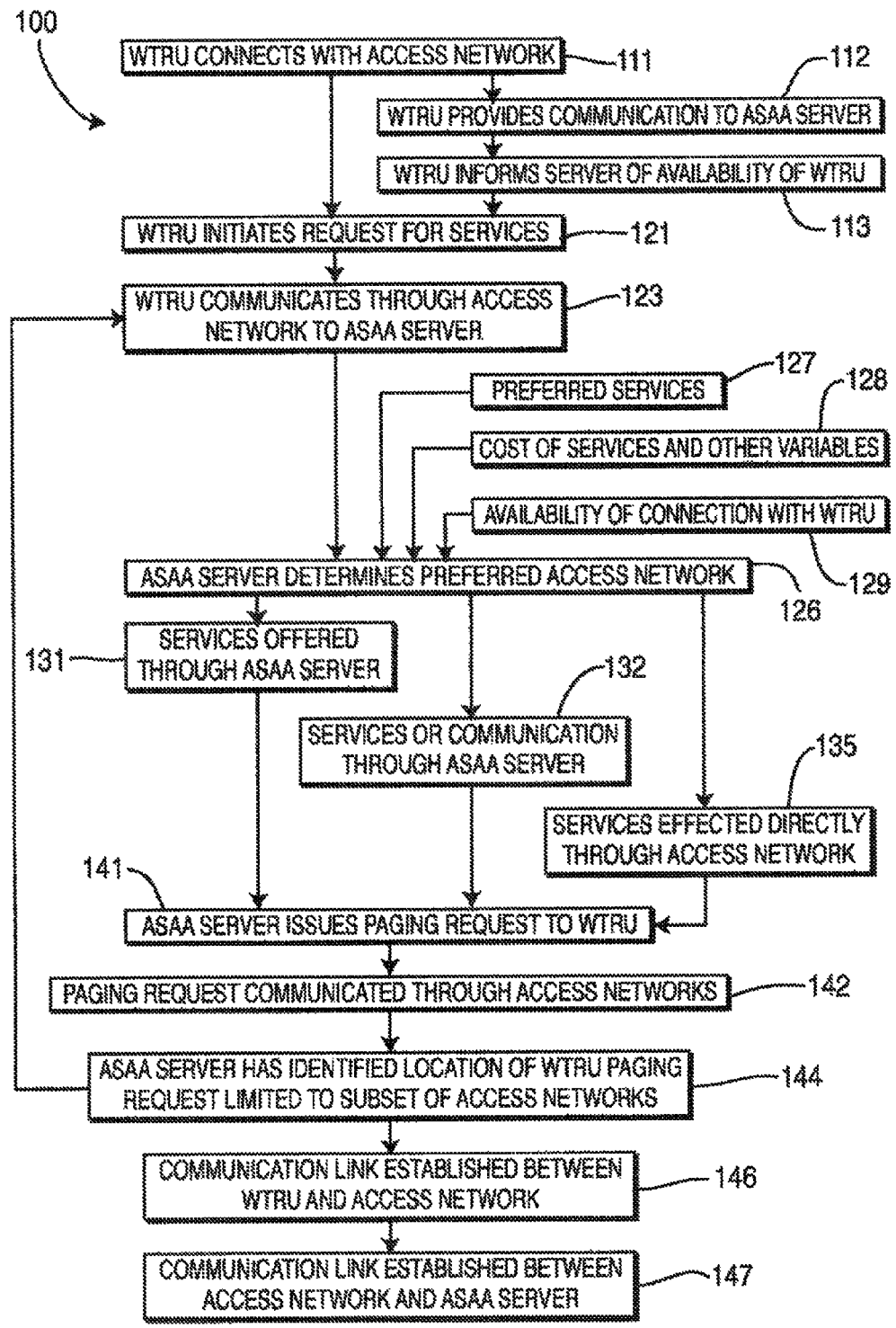
FIG. 3 is a flow diagram showing the functionality of one embodiment of the present invention.

FIG. 3 is a flow diagram 100 showing the functionality of one embodiment of the present invention. An ASAA association is established with a WTRU by the WTRU connecting with an access network (step 111) and providing a communication to an ASAA server (step 112), thereby informing the server of the availability of the WTRU (step 113). While it is not necessary that the ASAA server be informed of the availability (step 113), this facilitates location of the WTRU should the ASAA server receive a request to communicate with the WTRU.

The WTRU initiates a request for services (step 121) by communicating the request through the access network to the ASAA server (step 123). The ASAA server then responds by determining the preferred access network for establishment of the communication (step 126). The preferred access network is based on database input of the preferred services (step 127), cost of services and other variables (step 128) and responses from access networks of the availability of a connection with the WTRU (step 129). The ASAA then provides the services in the form of services offered through the ASAA server (step 131) or communication provided through the ASAA server (step 132). Alternatively, a connection for services can be effected directly through the access network (step 135).

In response to an external request for communications, the ASAA server issues a paging request to the WTRU (step 141), which is communicated through one or more access networks (step 142). In the event that the ASAA server has identified the location of the WTRU (step 144), this paging request can be limited to communication through one access network or a limited subset of access networks. A communication link is established between a WTRU and the access network (step 116), and between the access network and the ASAA server (step 147).

Figure 4:
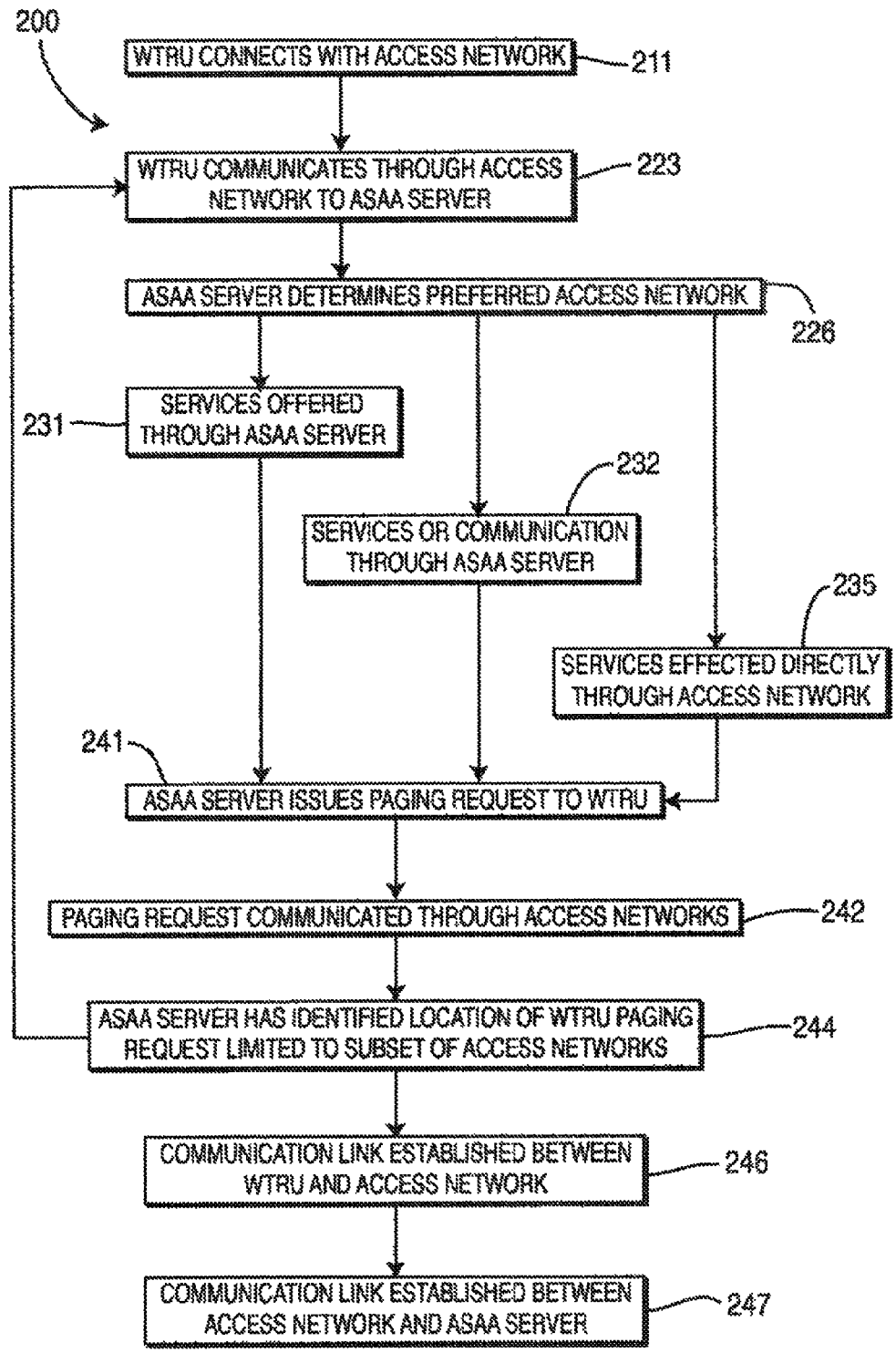
FIG. 4 is a flow diagram showing the functionality of an embodiment in which communications are initiated without prior establishment of an ASAA association with a WTRU.

It is possible for the ASAA server to communicate with the WTRU without being informed a priori of the availability of the WTRU (step 113). FIG. 4 is a flow diagram 200 showing the functionality of an embodiment of the present invention in which communications are initiated without prior establishment of an ASAA association with a WTRU. The WTRU connects with an access network (step 211) and provides a request for communication through the access network to the ASAA server (step 213). The ASAA server then uses that communication to determine an initial connection with the WTRU which has been established by the WTRU (step 225) in the request for communication.

The ASAA server then responds by determining the preferred access network for establishment of the communication (step 226). The preferred access network is based on database input of the preferred services (step 227), cost of services and other variables (step 228) and responses from access networks of the availability of a connection with the WTRU (step 229). The ASAA then provides the services in the form of services offered through the ASAA server (step 231) or communication provided through the ASAA server (step 232). Alternatively, a connection for services can be effected directly through the access network (step 235).

In response to an external request for communications, the ASAA server issues a paging request to the WTRU (step 241), which is communicated through one or more access networks (step 242). In the event that the ASAA server has identified the location of the WTRU (step 244), this paging request can be limited to communication through one access network or a limited subset of access networks. A communication link is established between a WTRU and the access network (step 246), and between the access network and the ASAA server (step 247).

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A wireless transmit/receive unit (WRTU) comprising:
    first interface circuitry configured to access a service of a public network via a server over a first access network; and
    second interface circuitry configured to
        switch networks to a second access network different than the first access network, wherein an access technology of the first access network is different from access technology of the second access network;
        receive a page from the server over the second access network;
        transmit a response to the page over the second access network; and
        continue to access the service of the public network via the server over the second access network.

2. The WRTU of claim 1, wherein the server comprises an Application Server Autonomous Access (ASAA) server.

3. The WRTU of claim 1, wherein the public network comprises a public switched telephone network (PSTN) or a public data network (PDN).

4. The WRTU of claim 1, wherein the second interface circuitry is configured to transmit the response including indicating the second access network to the server.

5. The WRTU of claim 1, wherein the second interface circuitry is configured to transmit the response including a message indicating availability of the WRTU to access the second access network.

6. The WRTU of claim 1, wherein the first interface circuitry and the second interface circuitry are configured to connect to the server, which maintains a fixed point of connection to the public network as the WRTU switches between the first access network and the second access network.

7. The WRTU of claim 1, wherein the second interface circuitry is further configured to receive the paging request and transmit the response using Internet Protocol (IP).

8. A method comprising:
    accessing a service of a public network, by a wireless transmit/receive unit (WRTU), via a server over a first access network;
    switching networks by the WRTU to a second access network different than the first access network, wherein an access technology of the first access network is different from access technology of the second access network;
    receiving a page from the server over the second access network;
    transmitting a response to the page over the second access network; and
    continuing to access the service of the public network via the server over the second access network.

9. The method of claim 8, wherein the server comprises an Application Server Autonomous Access (ASAA) server.

10. The method of claim 8, wherein accessing the service comprises exchanging data via the server with a public switched telephone network (PSTN) or a public data network (PDN).

11. The method of claim 8, wherein transmitting the response further comprises sending a message indicating the second access network to the server.

12. The method of claim 8, wherein transmitting the response further comprises sending a message indicating availability of the WRTU to access the second access network.

13. The method of claim 8, wherein accessing the service via the second access network further comprises the server maintaining a fixed point of connection to an external network as the WRTU switches between the first access network and the second access network.

14. The method of claim 8, wherein the receiving the paging request and transmitting the response comprises exchanging messages using Internet Protocol (IP).

15. A method comprising:
    transmitting a paging request to a wireless transmit/receive unit (WRTU), the paging request transmitted by a server via a first access network and a second access network different from the first access network, wherein an access technology of the first access network is different from access technology of the second access network, wherein the WRTU accesses a service of a public network via the server over the first access network;
    receiving a response to the paging request via the second access network from the WRTU; and
    routing data for the service to the WRTU via the second access network.

16. The method of claim 15, wherein the server comprises an Application Server Autonomous Access (ASAA) server.

17. The method of claim 15, wherein the public network comprises a public switched telephone network (PSTN) or a public data network (PDN) connected to the server.

18. The method of claim 15, wherein receiving the response further comprises receiving a message indicating availability of the WRTU to access the second access network.

19. The method of claim 15, further comprising maintaining a fixed point of connection to the service of the public network as the WRTU changes between the first access network and the second access network.

* * * * *